US011511822B2

(12) United States Patent
Baeumel et al.

(10) Patent No.: US 11,511,822 B2
(45) Date of Patent: Nov. 29, 2022

(54) ELECTRIC MOTORCYCLE

(71) Applicant: Bayerische Motoren Werke Aktiengesellschaft, Munich (DE)

(72) Inventors: Rainer Baeumel, Haunwang (DE); Hubert Graf, Munich (DE); Johannes Hoehl, Ortsteil Oberlappach (DE); Stefan Kallich, Munich (DE); Florian Traub, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/594,839

(22) PCT Filed: May 6, 2020

(86) PCT No.: PCT/EP2020/062525
§ 371 (c)(1),
(2) Date: Nov. 1, 2021

(87) PCT Pub. No.: WO2020/249320
PCT Pub. Date: Dec. 17, 2020

(65) Prior Publication Data
US 2022/0169330 A1    Jun. 2, 2022

(30) Foreign Application Priority Data
Jun. 11, 2019  (DE) .................. 10 2019 115 786.2

(51) Int. Cl.
*B62K 11/04*      (2006.01)
*B60K 11/02*      (2006.01)
(Continued)

(52) U.S. Cl.
CPC .............. *B62K 11/04* (2013.01); *B60K 11/02* (2013.01); *B60K 11/06* (2013.01); *B62J 43/16* (2020.02);
(Continued)

(58) Field of Classification Search
CPC ..... B60K 11/02; B60K 11/06; B60L 2200/12; B62J 43/16; B62K 11/04; B62K 2204/00
(Continued)

(56) References Cited
U.S. PATENT DOCUMENTS 9,821,883 B2    11/2017  Blasco Gracia et al.
9,941,768 B2 *   4/2018  Bock ..................... H02K 9/00
(Continued)

FOREIGN PATENT DOCUMENTS

DE    32 23 624 A1    1/1984
EP    2 143 627 A2    1/2010
EP    2 871 123 A1    5/2015

OTHER PUBLICATIONS

International Search Report (PCT/ISA/210) issued in PCT Application No. PCT/EP2020/062525 dated Sep. 22, 2020 with English translation (six (6) pages).
(Continued)

*Primary Examiner* — Tony H Winner
*Assistant Examiner* — Felicia L. Brittman
(74) *Attorney, Agent, or Firm* — Crowell & Moring LLP

(57) ABSTRACT

An electric motorcycle includes a housing for housing an electric motor and/or a transmission. The housing is positioned at the center of the electric motorcycle in a front view. An internal cooling device and/or an electronic component and two cooling elements extend outward from opposite sides of the housing. Exterior cooling ribs are arranged on the cooling elements. The cooling ribs extend in the longitudinal direction of the electric motorcycle, such that the cooling elements and the cooling ribs are directly in contact with the air surrounding the electric motorcycle. The cooling device and/or the electronic component is, at least in portions, housed in and thermally connected to at least one of the cooling elements.

14 Claims, 2 Drawing Sheets

(51) Int. Cl.
*B60K 11/06* (2006.01)
*B62J 43/16* (2020.01)
(52) U.S. Cl.
CPC ....... *B60L 2200/12* (2013.01); *B62K 2204/00* (2013.01)
(58) Field of Classification Search
USPC ........................................................ 180/220
See application file for complete search history.

(56) References Cited

U.S. PATENT DOCUMENTS

2010/0018787 A1 1/2010 Plazotta et al.
2017/0087977 A1 3/2017 Yokoyama

OTHER PUBLICATIONS

German-language Written Opinion (PCT/ISA/237) issued in PCT Application No. PCT/EP2020/062525 dated Sep. 22, 2020 (seven (7) pages).
German-language Office Action issued in German Application No. 10 2019 115 786.2 dated Jun. 5, 2020 with English translation (nine (9) pages).
German-language Decision to Grant issued in German Application No. 10 2019 115 786.2 dated Nov. 27, 2020 with English translation (14 pages).

* cited by examiner

ELECTRIC MOTORCYCLE

BACKGROUND AND SUMMARY OF THE INVENTION

The invention relates to an electric motorcycle.

An electric motorcycle is a two-wheeled vehicle which is driven at least partially by way of an electric motor. For this purpose, the electric motor converts the electrical energy which is stored in a high voltage battery into mechanical energy for propulsion.

Heat is produced as a result of energy losses both during operation and during charging of the high voltage battery. The heat then has to be dissipated correspondingly.

For this purpose, the solutions which are known from the prior art typically use an airbox which is arranged on the front fairing of the electric motorcycle and guides the surrounding air via a flow duct to the component to be cooled of the electric motorcycle.

The object of the invention consists in improving the heat dissipation of the electric motorcycle.

In order to achieve this object, an electric motorcycle is provided according to the invention which comprises a housing which is positioned in the center (in a front view) of the motorcycle for accommodating an electric motor and/or a transmission, an internal cooling device and/or an electronic component, and two cooling elements which are attached to opposite sides of the housing and extend away toward the outside from the side of the housing. Here, cooling fins which lie on the outside of the cooling elements are arranged, which cooling fins extend in the longitudinal direction of the electric motorcycle, with the result that the cooling element including its cooling fins is directly in contact with the surrounding air of the electric motorcycle. The cooling device and/or the electronic component are/is accommodated at least in sections in at least one of the cooling elements and are/is connected thermally to the cooling element, in order to dissipate thermal energy of the cooling device and/or the electronic component via the cooling element to the surroundings of the electric motorcycle.

The invention is based on the fundamental concept of cooling the internal cooling device and/or electronic component to be cooled by means of two cooling elements directly by way of the surrounding air of the electric motorcycle. Here, the cooling device and/or electronic components are/is arranged at least in sections in at least one of the cooling elements. The cooling elements protrude laterally from the electric motorcycle so as to project outward. As a result of the arrangement of the cooling elements, a large area of the cooling elements is directly in contact with the surrounding air, with the result that improved cooling is realized, since a greater quantity of thermal energy can be dissipated. By virtue of the fact that at least part of the cooling device and/or electronic component is arranged in cooling elements which project laterally from the electric motorcycle, additional installation space is obtained on the electric motorcycle, with the result that, for example, a larger battery can be installed.

According to the invention, "being directly in contact with the surrounding air of the electric motorcycle" is understood to mean that the slipstream which is produced in the case of a movement of the electric motorcycle flows around the cooling elements. The surrounding air is therefore not guided via a flow duct to the cooling elements.

In particular, five side faces of the cooling element are directly in contact with the surrounding air, with the result that a large contact area is provided between the cooling elements and the surrounding air.

One aspect of the invention provides that the cooling fins are formed in one piece on the associated cooling element. In this way, satisfactory thermal conduction is realized between the cooling element and the cooling fins.

In order to realize a homogeneous distribution of the thermal energy along the cooling fins, at least some of the cooling fins can run around the associated cooling element in a circumferentially closed manner.

The electronic component comprises, for example, a charging electronics unit and/or a power electronics unit which is heated greatly during operation.

In one refinement of the invention, the cooling device comprises a liquid cooler for a component of the electric motorcycle and/or a cooler for components of the electric motorcycle which are remote from the cooling element. Therefore, the heat dissipation of the components to be cooled of the electric motorcycle is improved by way of the cooling elements.

For example, the components of the electric motorcycle are the electronic component, the electric motor, the transmission and/or the battery of the electric motorcycle.

Water, oil, glycol or a glycol/water mixture can be used as cooling liquid for the liquid cooler.

At least one of the cooling elements can have a cavity, in which the cooling device and/or the electronic component are/is arranged. Therefore, the cooling device and/or the electronic component are/is protected against external influences, for example moisture.

In order to realize efficient thermal conduction, inner cooling fins which protrude into the cavity can be provided on at least one cooling element.

For example, the inner cooling fins in the cavity are connected directly to the cooling device and/or the electronic component via full-area contact. In this way, a simple construction of the cooling elements is ensured. The oil can also make direct contact with the fins.

It is conceivable that the cooling elements and the outer cooling fins comprise a light metal, preferably aluminum, or consist thereof. Therefore, a light cooling element is provided, with the result that weight is saved on the electric motorcycle. In addition, aluminum has highly satisfactory thermal conduction properties.

In order to realize a center of gravity of the electric motorcycle which is as low as possible, the cooling elements can extend in the middle or lower third of the height of the housing and can end in a manner which is spaced apart by at least 50 mm from the upper and lower end of the housing.

The cooling elements are preferably arranged in the lower two thirds of the housing and extend away toward the outside to such an extent that the cooling elements do not make contact with the road in a maximum lean position of the electric motorcycle.

Moreover, the cooling elements are shorter in the vehicle longitudinal direction than the housing, with the result that additional space is produced for the feet and legs of the rider of the electric motorcycle.

For example, as viewed in the vehicle longitudinal direction, the cooling elements in each case have a horizontal width which corresponds to at least 40% of the maximum width of the housing. Therefore, the foot region of the rider of the electric motorcycle is additionally protected in the case of the electric motorcycle falling over laterally.

The spacing of that point of each cooling element which is furthest away from a vertical center plane of the electric motorcycle, which center plane runs in the vehicle longitudinal direction, can be at least 35% and at most 50% of the overall width of the electric motorcycle. Therefore, the track of the electric motorcycle is determined by way of another component, for example the handlebar, and at the same time as large a contact area as possible is provided on the cooling elements for heat dissipation.

The two cooling elements are preferably arranged in a mirror-inverted manner with respect to that vertical center plane of the electric motorcycle which runs in the vehicle longitudinal direction. In this way, an inhomogeneous action of force of the slipstream on different sides of the electric motorcycle is prevented.

One variant of the invention provides that the electronic components are positioned in one cooling element and the liquid cooler is positioned in the other. The cooling element thus forms a part of the liquid cooler.

Furthermore, it is also conceivable for the cooler, for example a cooling line, of a component which is remote from the cooling element to be arranged in sections in the cooling element.

Further features and advantages of the invention result from the following description and from the appended drawings.

DETAILED DESCRIPTION OF THE DRAWINGS

Figure 1:
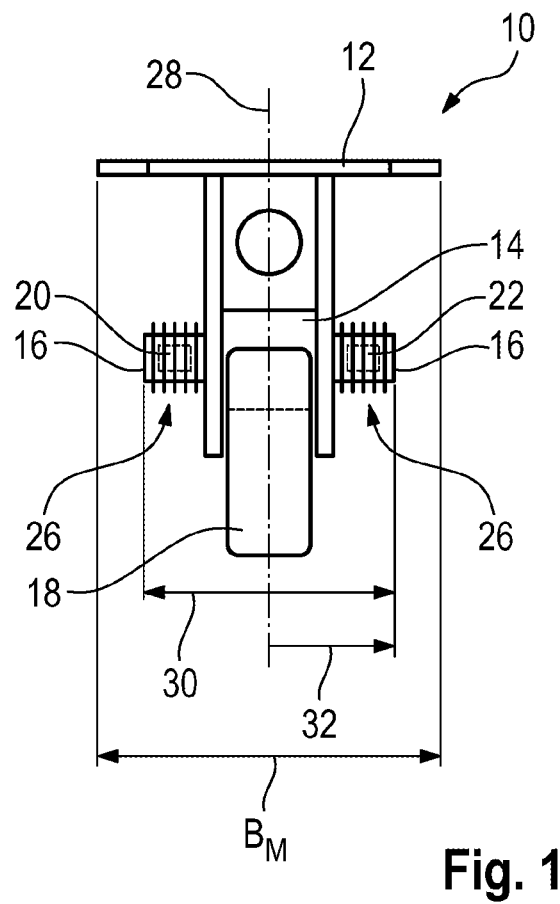
FIG. 1 shows a diagrammatic front view of an electric motorcycle according to an embodiment of the invention.

FIG. 1 diagrammatically shows an electric motorcycle 10 in a front view.

The electric motorcycle 10 is a motorcycle which is driven at least partially, in particular completely, by way of an electric motor.

The electric motorcycle 10 has a handlebar 12, a housing 14 for accommodating the electric motor and/or a transmission, two cooling elements 16, a front wheel 18, an internal cooling device 20, and a plurality of electronic components 22, of which only one is shown.

The lengths, widths and heights introduced in the following text of the electric motorcycle 10 and of individual components of the electric motorcycle 10, such as of the housing 14 and of the cooling elements 16, always relate to the installed position in the electric motorcycle 10.

The length of a component which is described in the following text is the extent in the longitudinal direction of the electric motorcycle 10, that is to say in the vehicle longitudinal direction, in the installed position. The width is then that extent of the component which is arranged in a horizontal direction orthogonally with respect to the vehicle longitudinal direction, and the height of a component is the extent in a vertical direction.

As shown in FIG. 1, the handlebar 12 defines the overall width BM of the electric motorcycle 10.

The internal cooling device 20 comprises, for example, a liquid cooler for the transmission, the electric motor or the battery of the electric motorcycle 10, and/or a cooler for the components of the electric motorcycle 10 which are remote from the cooling element.

The electronic component 22 has a power electronics unit and/or a charging electronics unit of the electric motorcycle 10.

The power electronics unit is, for example, an inverter which converts the DC voltage which is provided by the battery of the electric motorcycle 10 into an AC voltage, and/or a voltage transformer which transfers the high voltages (more than 60 V) of the battery into low voltages (from 12 V to 24 V) which is required for an on-board electrical system of the electric motorcycle 10. Components of the electric motorcycle 10 such as a digital tachometer, an indicator, etc. are supplied with electrical energy by way of the on-board electrical system.

The cooling elements 16 are arranged on opposite sides of the electric motorcycle 10.

More specifically, the cooling elements 16 are arranged on opposite sides of the housing 14, with the result that the cooling elements 16 produce a boxer silhouette for the electric motorcycle 10.

In other words, the cooling elements 16 produce a visual appearance as in the case of a motorcycle with a boxer engine, in the case of which the cylinders are arranged on opposite sides of the motorcycle.

The cooling elements 16 have a cavity 24 (see FIG. 4), in which the internal cooling device 20 and/or the electronic component 22 are/is accommodated at least in sections.

In the embodiment of FIG. 1, the internal cooling device 20 is arranged at least in sections in the left-hand (as viewed in the front view) cooling element 16, and the electronic component 22 is arranged at least in sections in the right-hand cooling element 16.

Since the internal cooling device 20 and the electronic component 22 are arranged within the associated cavity 24 and are therefore not visible in the front view of FIG. 1, the internal cooling device 20 and the electronic component 22 are shown using dashed lines in FIG. 1.

Outer cooling fins 26 are arranged in each case on the cooling elements 16, which cooling fins 26 extend in the longitudinal direction of the electric motorcycle 10 and run around the respective cooling element 16 in a circumferentially closed manner. The cooling fins 26 are formed in one piece on the associated cooling element 16, by together forming one cast part.

The cooling elements 16 in combination with the associated outer cooling fins 26 are therefore configured as ribbed radiators.

In the embodiment of FIG. 1, the cooling elements 16 and the outer cooling fins 26 are made from a light metal, preferably from aluminum.

It can be seen in FIG. 1 that the two laterally projecting cooling elements 16 are arranged in a mirror-inverted manner with respect to a vertical center plane 28 of the electric motorcycle 10, which center plane 28 runs in the vehicle longitudinal direction.

More precisely, the maximum outer spacing 30 of the cooling elements 16 from one another, that is to say the spacing from one another of those points of the respective cooling elements 16 which are furthest away from the center plane 28, is from 70% to 100% of the overall width BM of the electric motorcycle 10.

In FIG. 1, the outer spacing 30 is approximately 75% of the overall width BM of the electric motorcycle 10.

In other words, the spacing 32 from the center plane 28 of that point of each cooling element 16 which is furthest away from the center plane 28 is between 35% and 50% of the overall width BM of the electric motorcycle 10.

The cooling elements 16 are configured to dissipate the thermal energy of the cooling device 20 and the electronic component 22 to the surroundings of the electric motorcycle 10.

For this purpose, the left-hand cooling element 16 is thermally in contact with the cooling device 20, and the right-hand cooling element 16 is thermally and physically in contact with the electronic component 22, with the result that the thermal energy of the cooling device 20 and/or of the electronic component 22 is transferred to the cooling elements 16 and the corresponding cooling fins 26.

The cooling elements 16 and the cooling fins 26 are in contact with the surrounding air of the electric motorcycle 10, with the result that the thermal energy is output to the surrounding air by way of thermal conduction.

Figure 2:
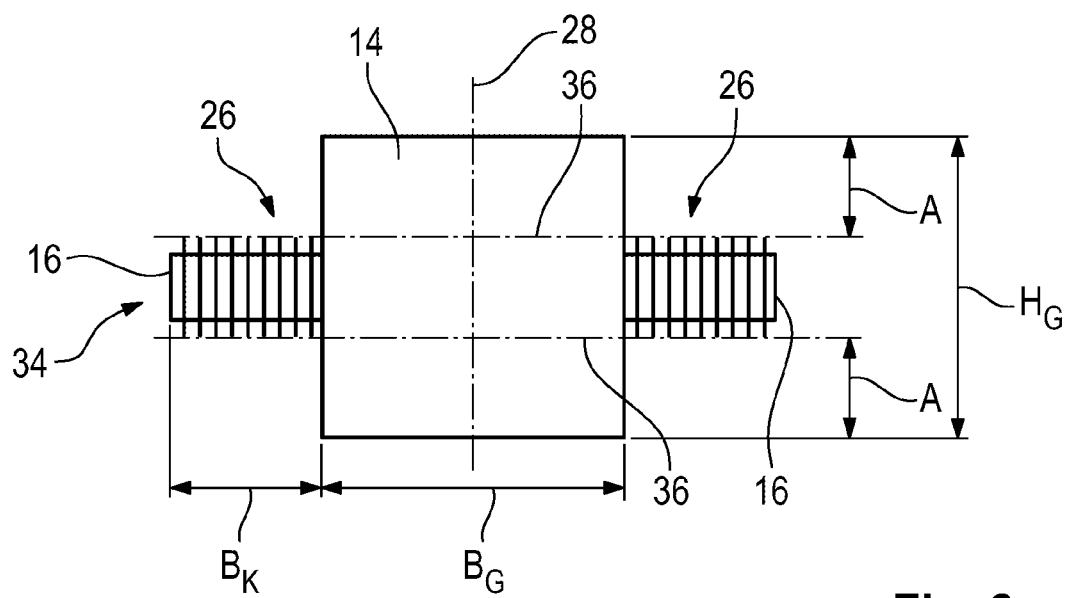
FIG. 2 shows a diagrammatic front view of a housing with cooling elements from FIG. 1.

FIG. 2 shows the housing 14 and the arrangement of the cooling elements 16 on the housing 14 in the front view of FIG. 1.

It can be seen that the cooling elements 16 which are configured, for example, as single-piece elements are attached on opposite sides of the housing 14.

In FIG. 2, moreover, the maximum height HG and the maximum width BG of the housing 14 and the width BK of a cooling element 16 are illustrated. Here, the width BK of the cooling element corresponds approximately to 50% of the width BG of the housing 14.

In general, the width BK of the cooling element 16 is at least 40% of the width BG of the housing 14.

It can be seen, furthermore, that the cooling elements 16 are attached laterally to the housing 14 in the vertically at least largely, preferably completely middle third 34. For illustrative purposes to this end, two auxiliary lines 36 are illustrated which divide the housing 14 in the height direction HG into three parts of equal size.

In general, the cooling element 16 can also be arranged in the lower third or in the lower two thirds of the housing 14, or can extend as far as there.

The cooling elements 16 are at a spacing A from the upper and lower end of the housing 14, which spacing A is at least 50 mm.

In the embodiment of FIG. 2, the spacings A from the upper and lower end of the housing 14 are identical. In general, they can of course be different.

Figure 3:
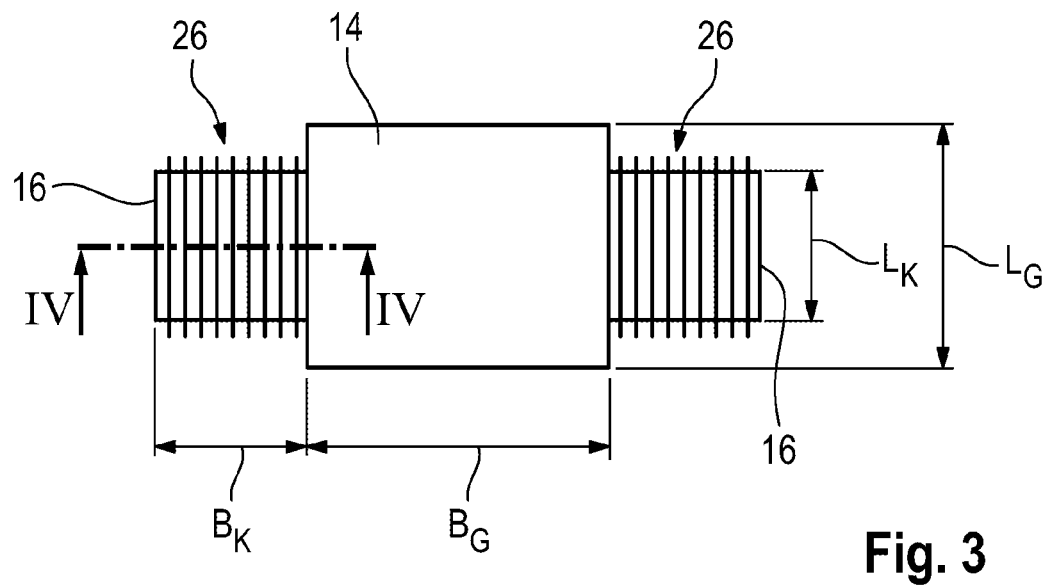
FIG. 3 shows a diagrammatic top view of the housing with cooling elements of FIG. 2.

FIG. 3 shows the housing 14 and the cooling elements 16 in a top view.

In addition to the width BG of the housing 14 and to the width BK of the cooling elements 16, the length LK of the cooling elements 16 and the length LG of the housing 14 are also illustrated.

It can also be seen that the cooling elements 16 are shorter in the vehicle longitudinal direction than the housing 14, that is to say the cooling elements 16 have a smaller length LK than the length LG of the housing 14.

Figure 4:
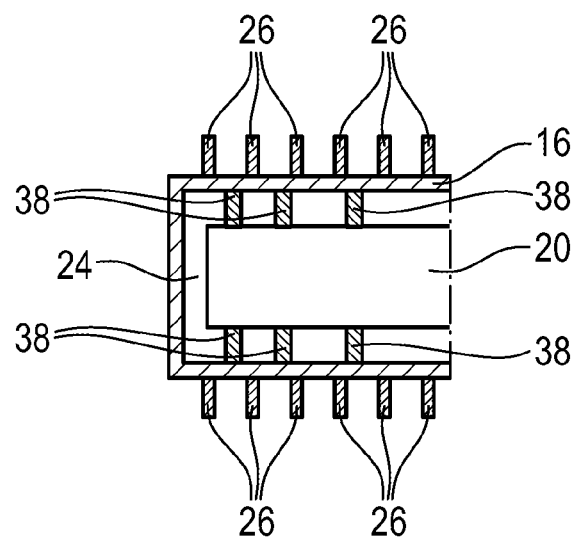
FIG. 4 shows a section through a cooling element along the sectional line IV-IV of FIG. 3.

FIG. 4 shows a section along the sectional line IV-IV of FIG. 3 through the left-hand cooling element 16.

Inner cooling fins 38 are provided in the interior of the cooling element 16, that is to say in the cavity 24, which cooling fins 38 make thermal contact between the internal cooling device 20 and the cooling element 16.

Therefore, direct thermal conduction is realized between the cooling device 20 and the cooling element 16 via the inner cooling fins 38.

The embodiment which is shown in FIG. 4 is to be understood only by way of example. It is conceivable that, as an alternative or in addition, the electronic component 22 is arranged within the cooling element 16 or between the fins.

Moreover, it is conceivable that the internal cooling device 20 and/or the electronic component 22 fill/fills the entire cavity 24 of the cooling element 16.

Furthermore, the cooling element 16 and/or the cooling fins 26, 38 can also be flowed through with liquid at least in sections, with the result that efficient cooling of the cooling liquid is provided.

What is claimed is:

1. An electric motorcycle, comprising:
   a housing positioned at a transverse center of the electric motorcycle;
   an electric motor accommodated in the housing;
   one or more of an internal cooling device and an electronic component; and
   two cooling elements attached to, and extending away from, opposite sides of the housing in a direction horizontally transverse to a longitudinal direction of the electric motorcycle,
   wherein
      the electric motor is arranged transversely between the two cooling elements such that, in the longitudinal direction, the electric motor is not within the two cooling elements,
      outer cooling fins arranged on an outside of each of the two cooling elements,
      the outer cooling fins extend in a longitudinal direction of the electric motorcycle such that the two cooling elements and their respective cooling fins are in contact with the surrounding air of the electric motorcycle,
      the one or more of the internal cooling device and the electronic component are accommodated at least in sections in at least one of the two cooling elements,
      the one or more of the internal cooling device and the electronic component are connected thermally to the at least one of the two cooling elements such that thermal energy from the one or more of the internal cooling device and the electronic component is dissipated via the at least one of the two cooling elements to the surroundings of the electric motorcycle,
      at least one of the two cooling elements has a cavity configured to receive at least one or more of the internal cooling device and the electronic component, and
      the at least one of the two cooling elements includes inner cooling fins protruding into the cavity.

2. The electric motorcycle according to claim 1, wherein the outer cooling fins are formed in one piece on the two cooling elements.

3. The electric motorcycle according to claim 2, wherein on each of the two cooling elements, at least one of the outer cooling fins runs around a respective one of the two cooling elements in a circumferentially closed manner.

4. The electric motorcycle according to claim 1, wherein on each of the two cooling elements, at least one of the outer cooling fins runs around a respective one of the two cooling elements in a circumferentially closed manner.

5. The electric motorcycle according to claim 1, wherein the internal cooling device includes one or more of
   a liquid cooler for a component of the electric motorcycle, and
   a cooler for components of the electric motorcycle which are remote from the cooling element.

6. The electric motorcycle according to claim 5, wherein the electronic component includes one or more of a power electronics unit and a charging electronics unit.

7. The electric motorcycle according to claim 1, wherein the electronic component includes one or more of a power electronics unit and a charging electronics unit.

8. The electric motorcycle according to claim 1, wherein the inner cooling fins in the cavity are connected to one or more of the internal cooling device and the electronic component.

9. The electric motorcycle according to claim 1, wherein the two cooling elements and the outer cooling fins are formed from a light metal.

10. The electric motorcycle according to claim 1, wherein the two cooling elements are arranged on the housing at a middle or lower third of a height of the housing,
the two cooling elements end are spaced by at least 50 mm from upper and lower surfaces of the housing and are shorter in the longitudinal direction than the housing.

11. The electric motorcycle according to claim 1, wherein the two cooling elements each have a horizontal width that is at least 40% of a maximum width of the housing.

12. The electric motorcycle according to claim 1, wherein a spacing of a point of each cooling element furthest away from a center plane of the electric motorcycle, the center plane being aligned with the longitudinal direction, is at least 35% of an overall width of the electric motorcycle.

13. The electric motorcycle according to claim 1, wherein the two cooling elements are arranged in a mirror-inverted manner with respect to a center plane of the electric motorcycle aligned with the longitudinal direction.

14. The electric motorcycle according to claim 1, wherein the housing is configured to accommodate the electric motor and a transmission.

* * * * *